United States Patent [19]

Marcantonio

[11] Patent Number: 4,554,138

[45] Date of Patent: Nov. 19, 1985

[54] LEACHING METALS FROM SPENT HYDROPROCESSING CATALYSTS WITH AMMONIUM SULFATE

[75] Inventor: Paul J. Marcantonio, Novato, Calif.

[73] Assignee: Chevron Research Company, San Francisco, Calif.

[21] Appl. No.: 666,519

[22] Filed: Oct. 30, 1984

[51] Int. Cl.$^4$ .................... C01G 31/00; C01G 39/00; C01G 41/00; C01G 51/00

[52] U.S. Cl. .......................................... 423/53; 423/56; 423/57; 423/62; 423/67; 423/68; 423/143; 423/145; 423/146; 423/150; 75/103; 75/106; 75/115; 75/119; 75/121

[58] Field of Search .................. 423/53, 56, 57, 62, 423/63, 67, 68, 143, 145, 146, 150; 75/103, 106, 115, 119, 121

[56] References Cited

U.S. PATENT DOCUMENTS

| | | |
|---|---|---|
| 2,204,193 | 6/1940 | Spicer et al. ..................... 423/56 |
| 3,539,290 | 11/1970 | Erickson et al. ................. 423/53 |
| 3,567,433 | 3/1971 | Gutnikov ........................ 423/53 |
| 4,145,397 | 3/1979 | Toida et al. .................... 423/56 |
| 4,434,141 | 2/1984 | Hubred et al. .................. 423/63 |
| 4,442,074 | 3/1984 | Hubred et al. .................. 423/63 |
| 4,500,495 | 2/1985 | Hubred et al. .................. 423/63 |

*Primary Examiner*—John Doll
*Assistant Examiner*—Robert L. Stoll
*Attorney, Agent, or Firm*—S. R. LaPaglia; W. K. Turner; E. A. Schaal

[57] ABSTRACT

A process for enhancing recovery of metals, especially cobalt, from spent hydroprocessing catalysts when the spent catalyst particles are first roasted at between 400° C. and 600° C. and then contacted with a first aqueous solution of ammonia and an ammonium salt to recover nickel, cobalt, molybdenum, tungsten, and vanadium. The once-leached spent hydroprocessing catalysts are again leached by contacting them with a second aqueous solution of ammonium sulfate at a pH of 1 to 4.

7 Claims, 2 Drawing Figures

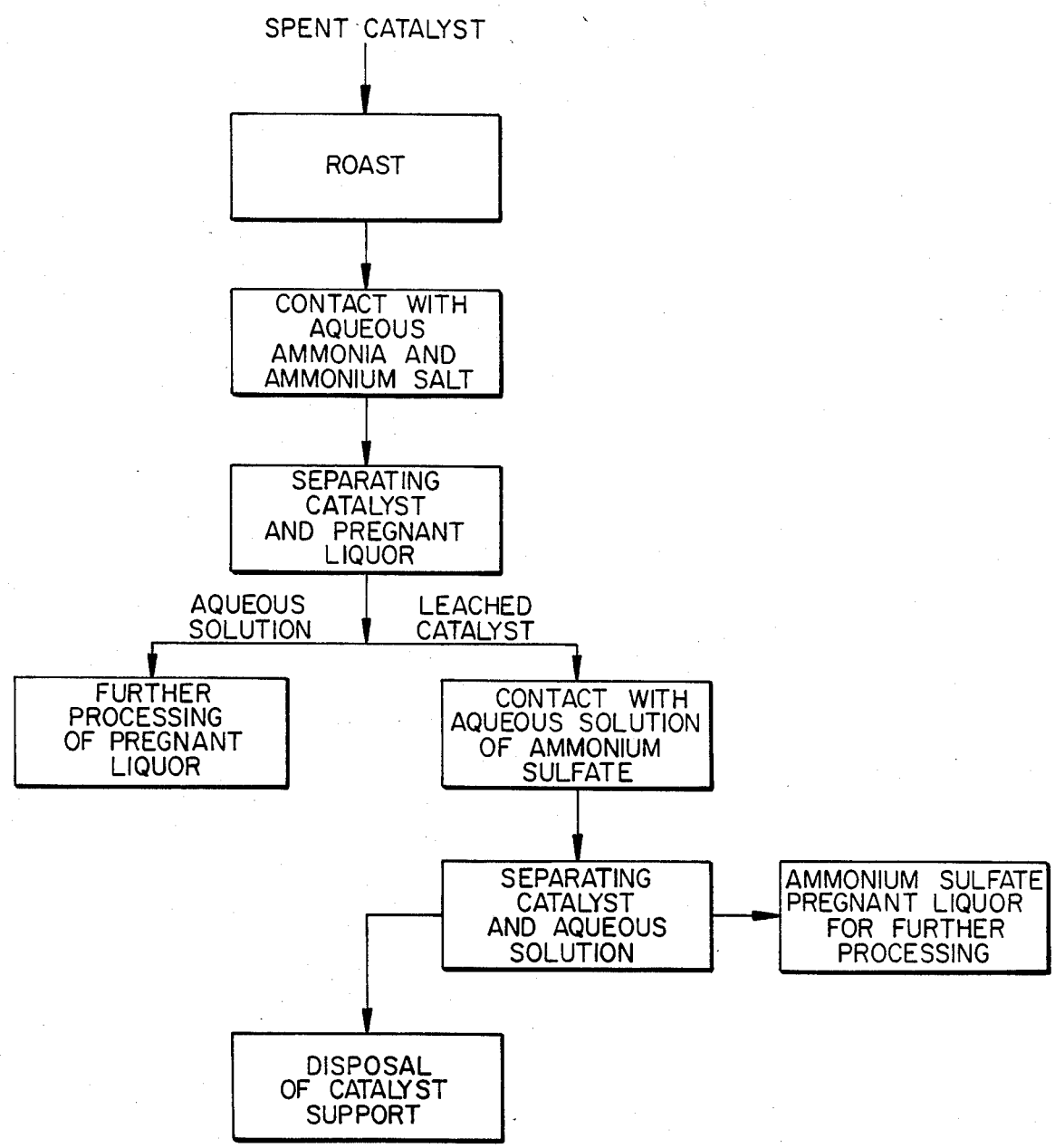
FIG._1.

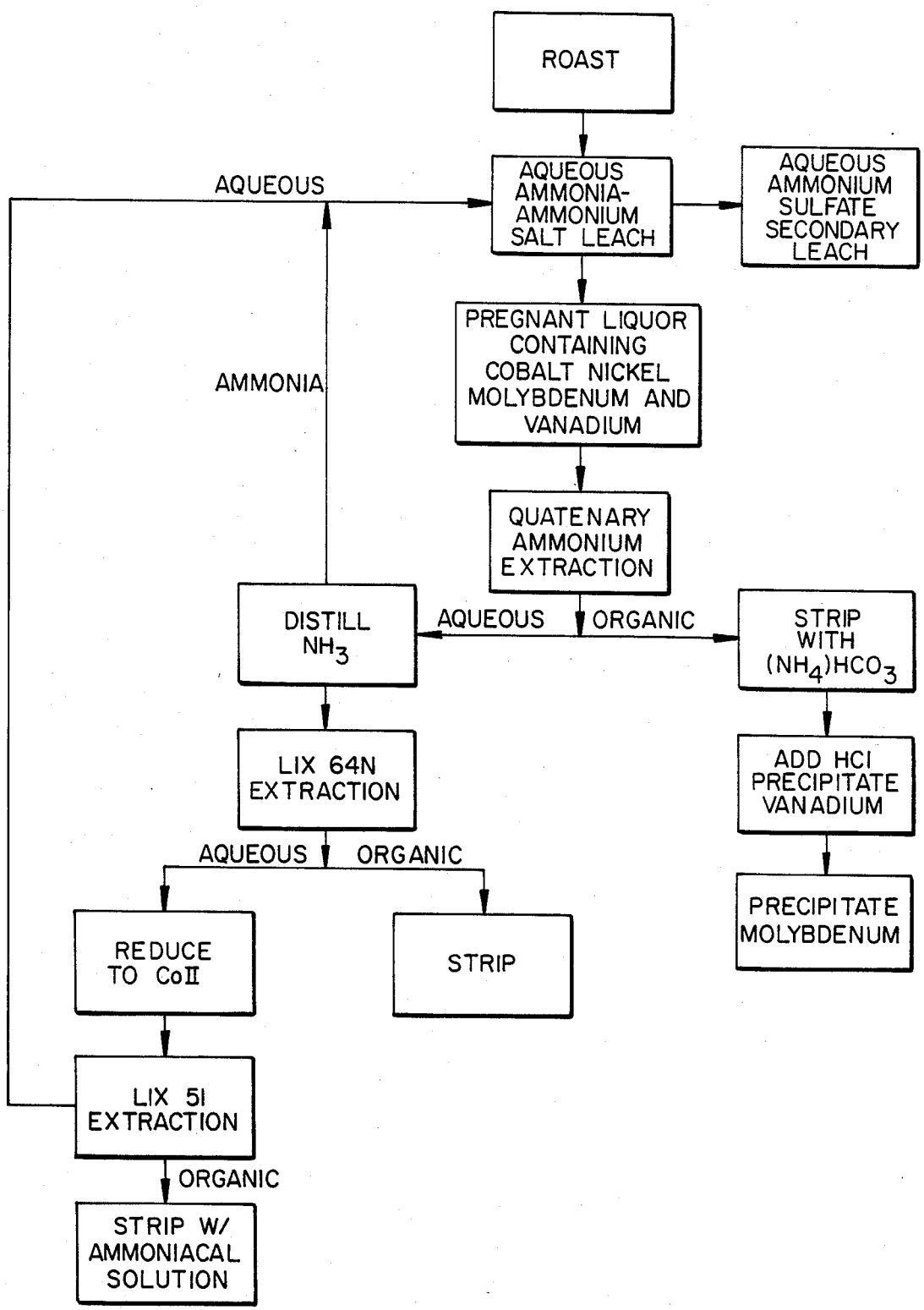
FIG._2.

LEACHING METALS FROM SPENT HYDROPROCESSING CATALYSTS WITH AMMONIUM SULFATE

BACKGROUND OF THE INVENTION

This invention relates to methods of leaching metals from spent hydroprocessing catalysts, particularly methods of enhancing cobalt recovery from spent hydroprocessing catalysts by the use of ammonium sulfate leaching.

One modern development in crude oil processing is the upgrading of metal and sulfur containing feedstocks, e.g., crude oils and residua by hydroprocessing methods. Such upgrading is necessary to convert the heavy feedstock into more valuable, lower boiling fractions and to remove contaminants, particularly metals and sulfur, that can pollute the atmosphere upon combustion.

Crude oils contain various dissolved contaminants, including nickel, vanadium, iron, and sulfur. The lighter fractions are frequently distilled off under atmospheric pressure or a partial vacuum leaving the metals in a high boiling fraction generally called the "residual fraction," or "residua." Residua will generally contain at least 35 ppm metal contaminants, frequently as high as 100 ppm, and in extreme cases, higher than 1000 ppm.

These metals and any sulfur present are removed, thereby upgrading the feedstock, by processing the feedstock, with a catalyst, in the presence of hydrogen. Such catalysts are generally a solid support that contains catalytic metals, generally either molybdenum or tungsten with either nickel or cobalt. As the catalyst is used, metals from the feedstock deposit on its exterior surface and the interior surface of its pores, eventually plugging the pores and reducing the activity of the catalyst to such an extent it does not give the desired product quality. Such catalysts are herein defined as "spent catalysts," and contain catalytic metals, an inorganic support matrix, metals removed from the feedstock, sulfur compounds, and a hydrocarbonaceous residuum.

Recently, the obtainable crude oil is tending to be heavier, forcing refiners to use more hydroprocessing catalysts than heretofore necessary to remove metals and sulfur from the feedstock. A shortage of the valuable catalytic metals, particularly cobalt, is therefore possible. In an effort to recycle the catalytic metals, providing a renewable source of the metals and to produce a benign waste, efforts have been made to extract metals from hydroprocessing catalysts, particularly hydrodesulfurization and hydrodemetalation catalysts.

One general method of leaching hydroprocessing catalysts is disclosed in U.S. Pat. No. 3,567,433. An aqueous ammonia and ammonium salt leach solution is contacted with spent catalyst particles. The conditions of the system were not optimized, resulting in low metals recovery.

Another leaching process is disclosed in Chemical Abstracts, 94:178649x. A spent catalyst, containing aluminum, vanadium, nickel, cobalt, and molybdenum, was leached with ammonia and ammonium salts, at a temperature greater than 110° C. and an oxygen partial pressure of greater than 1 kg/cm$^2$, for more than $\frac{1}{2}$ hour.

Other methods of recovering metals from spent demetalation or desulfurization catalysts are known. U.S. Pat. No. 4,216,118 discloses chlorinating spent catalysts to convert vanadium values to vanadium tetrachloride and nickel values to nickel chloride for recovery by solvent extraction. U.S. Pat. No. 4,145,397 discloses recovery of metals from spent catalysts by roasting at high temperatures and leaching with caustic alkali.

An article in Engineering and Mining Journal, May 1978, page 105, describes a plant to process spent catalysts containing no cobalt by first leaching with sodium hydroxide and then with ammonium carbonate.

U.S. Pat. No. 4,434,141 teaches the leaching of Group VB metals, Group VIB metals, and Group VIII metals from spent hydroprocessing catalyst with aqueous ammonia and ammonium salt solutions. For example, Mo, V, Co, Ni, and W are leached from spent hydroprocessing catalyst with an aqueous ammoniacal solution. The Mo, V, and W are separated from Co and Ni by extraction from the aqueous phase with quaternary ammonia compounds and the Ni and Co are separated from the aqueous phase by extraction with an oxime and beta-diketone, respectively. This reference is incorporated herein by reference.

U.S. Pat. No. 4,432,953 discloses a process for leaching cobalt from spent leached hydroprocessing catalyst with sulfur dioxide. However, since SO$_2$ is toxic, it involves problems with contaminant.

Cobalt is a particularly difficult metal to remove from hydroprocessing catalysts by conventional aqueous leaching techniques. Under optimum leaching conditions, an aqueous leach solution of ammonia and an ammonium salt rarely removes more than about 50 percent of the cobalt present on the spent catalyst. It has been discovered that if the spent catalysts are leached by a first aqueous solution of ammonia and ammonium salt and subsequently leached by a second aqueous solution having ammonium sulfate dissolved therein at a pH in the range of from 1 to 4, total recovery of cobalt can be well over 90 percent of the metal present on the initial spent catalyst.

SUMMARY OF THE INVENTION

A method is provided for leaching spent hydroprocessing catalyst particles containing carbonaceous and sulfurous residua. The particles are first roasted at a temperature in the range of between 400° C. and 600° C. to remove the carbonaceous and sulfur residues. The particles are then leached with a first aqueous solution containing ammonia and an ammonium salt. The liquid is separated from the catalyst which is then leached with a second aqueous solution containing ammonium sulfate at a pH in the range of from 1 to 4 and preferably 1.5 to 2.5. The twice-leached catalyst is separated from the pregnant liquor. The pregnant liquor from the aqueous ammonium sulfate leach may be added to the pregnant liquor from the aqueous solution of ammonia and ammonium salt leach or the metals therein may be precipitated by addition of hydrogen sulfide. The precipitate may then be roasted separately or added to unroasted spent catalyst and roasted, and then leached with the spent newly roasted catalyst in aqueous ammoniacal solution. By this method, substantially all the cobalt present can be recovered.

DETAILED DESCRIPTION OF THE PREFERRED EMBODIMENTS OF THE INVENTION

Metals deposited on hydroprocessing catalysts, and include Groups VB and VIB catalytic metals and Group VIII transistion metals, and in particular the combination of nickel, cobalt, tungsten, molybdenum and vanadium, can all be removed simultaneously from spent hydroprocessing catalysts by the use of an aqueous leach solution of ammonia and an ammonium salt. Spent hydroprocessing catalysts can be regarded as a high grade ore that contains a peculiar metals composition. Leaching is the method of choice for metals removal from this particular ore since the supports are porous and the metals individually are all known to be leachable.

One of the more valuable metals in spent catalyst is cobalt. Typically, less than 50 percent of the cobalt on the catalyst is leached with an aqueous solution of ammonia and ammonium salt. It has been found that by contacting the once-leached catalyst from an ammonia leach with a second aqueous leach having ammonium sulfate dissolved therein and adjusted to a pH of 1 to 4 with, for example, a mineral acid such a sulfuric acid, it is possible to recover greater than 80 percent of the total initial amount of cobalt present on the unroasted spent catalyst.

To simplify downstream processing, it is preferable to process one aqueous metals-containing stream. The best choice, for processing, is an aqueous ammoniacal stream. To place the metals leached by the aqueous ammonium sulfate solution into the ammoniacal solution, the metals may be precipitated as sulfides. Any metal sulfides so recovered may be roasted separately or mixed with unroasted spent catalyst and reroasted, and then releached with the first aqueous ammoniacal solution. The first pregnant liquor, the metals-containing product of the first aqueous solution, therefore will have an equilibrium value of cobalt greater than that if the feed were only spent catalysts.

The spent catalyst, as it comes from the catalytic reaction vessel, is highly contaminated with carbonaceous deposits, also termed "coke," and sulfur. These contaminants are easily removed by combustion in an atmosphere containing molecular oxygen, for example, air, but it has been found that the amount of metals leached from the catalyst particles, particularly nickel, tends to suffer if the catalyst is roasted at too high a temperature. Preferable conditions for reaction with oxygen are at less than 600° C., preferably between 400° C. and 500° C. Temperature can be controlled by diluting the oxygen with nitrogen or by other methods known to the art. The catalyst so treated is free from substantial carbonaceous residue and the metals contained therein can be easily removed by a first aqueous leach. The first aqueous leach solution is a solution of ammonia and an ammonium salt. Such a solution will be alkaline, which is preferred to solubilize vanadium, tungsten, and molybdenum, and will contain free ammonia, an effective complexing agent for nickel and cobalt. Ammonia and ammonium carbonate solutions are especially well suited as they allow reagent recycle by means of distillation of the pregnant liquor and reabsorption in fresh or recycle aqeuous solution. Ammonium sulfate is another preferred ammonium salt for the practice of this invention. Nickel and cobalt will be free cations and form ammine complexes, and molybdenum, tungsten, and vanadium will be in the form of anionic oxide ions and will form ammonium salts.

The catalyst support of the spent catalyst particles will frequently be alumina. However, mixtures of alumina with other refractory inorganic oxides, for example, silica, boria, magnesia and titania, as well as supports that contain naturally occurring alumina-containing clays, for example, kaolin or halloysite, may be leached by the process of this invention.

It will be understood that the catalyst will typically be in the form of uniformly shaped particles, elongated extrudates or spherical particles. Other shapes may be processed by the method of this invention. The catalyst may be crushed or otherwise processed to change its shape before the application of this invention.

In a buffered system such as the ammonia and ammonium salt leach system, two factors must be adjusted for optimal extraction: the concentration of leaching species and the pH of the leach solutions. The solution must contain sufficient ammonia to complex the nickel and cobalt present, and sufficient ammonium to control pH. The pH should be not lower than 9.5, or molybdenum and vanadium recoveries suffer, and not higher than 11, or nickel and cobalt recoveries suffer. A concentration of ammonia $NH_3(aq)$, hereinafter ammonia, plus $NH_4^+(aq)$, hereinafter ammonium, not exceeding 8 molar and having the ammonia-ammonium concentration ratios from about 1 to 3, up to 3 to 1, and preferably 1 to 1 approximately meets these requirements. It is preferred that the solution have at least a six-fold molar ratio of ammonia compared to the amount of cobalt ion plus nickel ion calculated to be on the spent catalyst particles. The molar concentration of the ammonium salt should not exceed about 4 molar, otherwise a vanadium compound precipitates. An especially preferred leach system is one where the ammonia concentration is initially substantially equal to the ammonium ion concentration and both species are present in about 2 molar concentrations.

It has been observed that the length of time of the primary leach is important for maximum cobalt yield. To maximize cobalt recovery in the primary or first leach, the catalyst particles should not be in contact with the leach solution for more than fifteen minutes and preferably not longer then ten minutes. The temperature of the leach is also important. In general, the higher the temperature, the more any particular species will go into solution; but a practical upper limit is the boiling point of the solution at atmospheric pressure, above which a pressure vessel would be required. A temperature in the range of from 40° C. to 90° C. is preferred and, in practice, a temperature of between about 70° C. and 90° C. is found to be optimal. For example, after 15 minutes at about 85° C., the leach solution will typically contain more than 85 percent of the molybdenum, about 75 percent to 80 percent of the nickel, 75 percent to 85 percent of the vanadium, and at least 45 percent of the cobalt. (These percentages refer to the amount by weight of metal in solution compared to the amount of metal that was on the spent catalyst before leaching.) Less than 0.1 percent of the alumina is extracted and less than 5 percent of the iron is extracted.

The once-leached catalyst particles are then removed from the first pregnant liquor and contacted with a second aqueous solution of ammonium sulfate at a pH in the range of from about 1 to 4 and preferably 1.5 to 2.5. Preferably, the concentration of ammonium sulfate is in the range of from about 0.1 to 6 molar and preferably from 0.5 to 2 molar. The temperature of the leach solution may be from 25° C. to 100° C., preferably between 80° C. and 100° C.

The twice-leached catalyst is then removed from the second pregnant liquor. The pregnant liquor from the aqueous ammonium sulfate leach may be added to the pregnant liquor from the aqueous solution of ammonia and ammonium salt leach or the metals dissolved therein may be precipitated by addition of hydrogen sulfide to the solution. The precipitated metal sulfides may be removed from the second pregnant liquor and may be roasted separately or mixed with unroasted spent catalyst and roasted, and then leached with the same aqueous ammonia and aqueous ammonium salt solution used to leach the initial spent catalyst. The temperature of the second pregnant liquor during the hydrogen sulfide treatment is preferably between 70° C. and 100° C. Sufficient $H_2S$ should be present to precipitate out the metals of interest. It is preferable that metal sulfide seeds be used in the concentration range of from 10–100 gm/liter to assist in the precipitation of the metal sulfides and that the pH be in the range of from 2 to 7 and preferably 3 to 5.

The alumina support of the catalyst tends to be leached into the second aqueous solution.

DETAILED DESCRIPTION OF THE DRAWING

FIG. 1 shows an embodiment of this invention. Spent catalyst is roasted in air at 400° C. to 600° C. The roasted catalyst is then contacted with an aqueous solution containing both ammonia and an ammonium salt. The temperature of this leach is maintained at about 90° C. The pregnant liquor is further processed, as shown in FIG. 1. The once-leached catalyst is contacted with a 1M aqueous solution of ammonium sulfate at a pH of 2 and a temperature of about 60° C. The aqueous solution of ammonium sulfate and leached metals is removed from the twice-leached catalysts which catalysts are disposed of. The aqueous ammonium sulfate solution is contacted with hydrogen sulfide, precipitating metal values from the solution. The metal values precipitated are primarily cobalt and additionally, to a lesser extent, molybdenum, vanadium, and nickel. The precipitated sulfides are placed back into the roast to be reroasted and releached with the ammoniacal solution. In this manner, substantially all of the cobalt is recovered and an ammoniacal stream is provided for further processing.

FIG. 2 illustrates the use of this invention as the leach in a process flow scheme according to as U.S. Pat. No. 4,434,141 for recovering metals from spent catalysts known to contain cobalt, nickel, molybdenum and vanadium. The catalyst is first roasted in air under conditions where the temperature is controlled to less than 600° C. The spent roasted catalyst is then leached with the aqueous ammonia and ammonium salt solution at a pH of from about 9.5 to 11 and preferably about 10.5, at a temperature in the range of about 70° C. to 90° C., preferably 90° C. until cobalt values in solution start to decrease. The pregnant liquor is then extracted with a quaternary amine, forming a first set of two streams: an organic stream containing molybdenum and vanadium, and an aqueous stream containing cobalt and nickel. The first organic stream is stripped with an aqueous solution of ammonium bicarbonate. Hydrochloric acid is added to the aqueous strip solution and ammonium metavanadate is precipitated. The volume of the solution is then reduced and ammonium molybdate is precipitated.

Excess ammonia is removed from the first aqueous stream, by heating the solution. The solution at a pH of about 9 to 10 and preferably about 9.5, which is exposed to air insuring that cobalt is in the trivalent oxidation state, is extracted with the oxime LIX ®64N, removing the nickel and creating a second set of two streams: an aqueous stream containing cobalt and any impurities, and an organic stream containing nickel. The second organic solution is stripped with sulfuric acid, forming an acidic nickel-containing sulfate solution. The cobalt in the second aqueous stream is reduced over cobalt shot, and extracted with the beta-diketone LIX ®51, thereby forming a third set of aqueous and organic streams.

The third aqueous stream is recycled to the leach step, enriched in ammonia removed from the ammonia distillation step. The third organic stream is stripped with solution of a solution of ammonia and ammonium carbonate.

By the use of the flow scheme in FIG. 1, a process is provided that is entirely compatible with an ammoniacal leach. Therefore, the pregnant liquor from the leach should be in aqueous ammoniacal solution.

The following Example will serve to further illustrate the process of this invention without limiting the same.

EXAMPLE

Spent catalyst containing Co, Mo, Ni, and V was roasted between 400° C. and 600° C. The roasted catalyst was then contacted for 3 hours at 5 percent solids and 90° C. with a solution containing 2M $NH_3$+1M $(NH_4)_2CO_3$. After filtering the pregnant liquor away from the leached residue, the solids were then contacted for 4 hours at 20 percent solids and 60° C. with a solution containing 1M $(NH_4)_2SO_4$ and maintained at pH 2.0. The metals extracted in the two-step leaching procedure are shown below.

| | Incremental Metals Extraction From Spent Roasted Catalyst, % | | | |
|---|---|---|---|---|
| | Co | Mo | Ni | V |
| First Leach | 22 | 88 | 59 | 60 |
| Second Leach | 66 | 2 | 24 | 7 |
| Total Extraction | 88 | 90 | 83 | 67 |

Metals were recovered from a secondary leach solution by precipitation with hydrogen sulfide. Thus, a solution was partially neutralized to pH 5, heated to 90° C., and contacted with $H_2S$ gas in the presence of sulfide seed material. Metals concentration in solution before and after precipitation is shown below.

| | Metals Concentration In Secondary Leach Solution, ppm | | | |
|---|---|---|---|---|
| | Co | Mo | Ni | V |
| Initial | 418 | 15 | 120 | 10 |
| After $H_2S$ | <2 | 7 | <2 | 6 |

A typical sulfide precipitate was roasted at a temperature not exceeding 400° C. and then contacted with ammoniacal primary leach solution to recover the valuable metals. Analysis of the calcined precipitate before and after leaching is shown below.

| | Metals Recovery From Calcined Sulfide Precipitate, % | | | | | |
|---|---|---|---|---|---|---|
| | Co | Mo | Ni | V | Al | Fe |
| Calcined Precipitate | 9.1 | 3.0 | 2.5 | 0.17 | 4.9 | 12.1 |
| Leach Residue | 3.1 | 0.46 | 0.46 | 0.35 | 12.8 | 29.7 |
| Metals | 87 | 94 | 93 | 23 | 3.6 | 9.2 |

What is claimed is:

1. A process to extract metals from spent hydroprocessing catalyst particles comprising:
   (a) roasting said catalyst particles at a temperature in the range of between 400° C. and 600° C.;
   (b) contacting said roasted catalyst particles with a first aqueous solution of ammonia and ammonium salt;
   (c) separating said catalyst particles from said first aqueous solution;
   (d) contacting said catalyst particles with a second aqueous solution of ammonium sulfate at a pH in the range of from about 1 to 4; and
   (e) separating said catalyst particles from said second solution.

2. The process of claim 1 comprising the additional step of precipitating metals present in said second solution with hydrogen sulfide as metal sulfide.

3. The process of claim 2 wherein the temperature of said second solution during said precipitation step is from about 25° C. to 100° C.

4. The process of claim 2 comprising roasting said precipitated metal sulfide with fresh spent catalyst in step 1(a).

5. The process of claim 1 wherein said spent hydroprocessing catalysts are supported on alumina.

6. The process of claim 1 wherein said first aqueous solution has a pH maintained in the range of 9.5 to 11 and concentrations of ammonia plus ammonium salt do not exceed 8 molar.

7. The process of claim 1 wherein the pH of said second solution is maintained at between 1.5 and 2.5.

* * * * *